United States Patent
Carpenter et al.

(10) Patent No.: US 6,557,803 B2
(45) Date of Patent: May 6, 2003

(54) CREWED ON-ORBIT, RETURNABLE, AND REUSABLE SPACE VEHICLE

(75) Inventors: Jon J. Carpenter, Redondo Beach, CA (US); Jeffrey J. Cronick, Huntington Beach, CA (US); Jennifer L. Green, Houston Safety Harbor, TX (US); Brian R. Lindley, Corona del Mar, CA (US); James K. Wechsler, Irvine, CA (US); Thomas R. Smith, Westminister, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/944,811

(22) Filed: Aug. 31, 2001

(65) Prior Publication Data

US 2003/0042367 A1 Mar. 6, 2003

(51) Int. Cl.$^7$ ................................................ B64G 1/14
(52) U.S. Cl. ..................................... 244/162; 244/158 R
(58) Field of Search ........................... 244/158 R, 160, 244/162, 172, 140, 146

(56) References Cited

U.S. PATENT DOCUMENTS

| | | | |
|---|---|---|---|
| 2,941,764 A | * 6/1960 | Lee ............................ 244/1 R |
| 3,421,714 A | 1/1969 | Koerner |
| 3,700,193 A | * 10/1972 | Bradley ........................ 244/162 |
| 3,702,688 A | * 11/1972 | Faget ........................... 244/1 R |
| 3,753,536 A | 8/1973 | White |
| 3,891,160 A | 6/1975 | Minovitch |
| 3,929,306 A | 12/1975 | Faget et al. |
| 3,955,784 A | 5/1976 | Salkeld |
| 4,079,904 A | 3/1978 | Groskopfs et al. |
| 4,082,240 A | 4/1978 | Heathman et al. |
| 4,265,416 A | * 5/1981 | Jackson et al. ............... 244/160 |
| 4,451,017 A | * 5/1984 | Marshall ..................... 244/172 |
| 4,471,926 A | 9/1984 | Steel, III |
| 4,580,746 A | * 4/1986 | Peck ............................ 244/120 |
| D291,555 S | * 8/1987 | Rosenthal ................ 244/158 R |
| 4,723,736 A | 2/1988 | Rider |
| 4,802,639 A | * 2/1989 | Hardy et al. ............... 244/137.4 |
| 4,834,324 A | 5/1989 | Criswell |
| 4,884,770 A | 12/1989 | Martin |
| 5,031,857 A | * 7/1991 | MacConochie et al. ...... 244/172 |
| 5,090,642 A | * 2/1992 | Salkeld ..................... 244/137.1 |
| 5,141,181 A | 8/1992 | Leonard |
| 5,143,327 A | * 9/1992 | Martin .................... 244/158 R |
| 5,186,419 A | * 2/1993 | Scott ....................... 244/158 R |

(List continued on next page.)

OTHER PUBLICATIONS

Charles J. Sosa et al., Design and Integration of a Cryogenic Propellant Crossfeed System for Parallel Burn Vehicles, ©1993 by the American Institute of Aeronauticsand Astronautics, Inc., 12 pgs.

Primary Examiner—Charles T. Jordan
Assistant Examiner—Stephen A Holzen
(74) Attorney, Agent, or Firm—Harness Dickey & Pierce P.L.C.

(57) ABSTRACT

A returnable and reusable space vehicle including a main body separate from and releasably mounted to a booster rocket assembly. A crew compartment module is provided that is separate from and releasably mounted to the main body. A propellant system is operably coupled to the crew compartment module so as to propel the crew compartment module from the main body during an emergency procedure. An orientation control system is coupled to the propellant system such that the orientation control system maintains the crew compartment module in a predetermined attitude during the emergency procedure. A pair of aerodynamic lifting wings extend from the main body to provide aerodynamic lift to the main body to permit the main body to return from the orbit and land.

31 Claims, 4 Drawing Sheets

U.S. PATENT DOCUMENTS

| | | | |
|---|---|---|---|
| 5,203,844 A | | 4/1993 | Leonard |
| 5,217,187 A | | 6/1993 | Criswell |
| 5,228,644 A | | 7/1993 | Garriott et al. |
| 5,242,135 A | * | 9/1993 | Scott ..................... 244/158 R |
| 5,295,642 A | * | 3/1994 | Palmer ................... 244/158 R |
| 5,322,248 A | | 6/1994 | Ragab |
| 5,456,424 A | * | 10/1995 | Palmer ....................... 244/172 |
| 5,507,451 A | * | 4/1996 | Karnish ...................... 102/348 |
| 5,626,310 A | | 5/1997 | Kelly |
| 5,740,985 A | * | 4/1998 | Scott et al. .............. 244/137.4 |
| 5,799,902 A | * | 9/1998 | Keith et al. ................. 244/172 |
| 5,927,653 A | * | 7/1999 | Mueller et al. ......... 244/138 R |
| 6,017,000 A | | 1/2000 | Scott |
| 6,056,237 A | | 5/2000 | Woodland |
| 6,113,032 A | * | 9/2000 | Cochran et al. ........ 244/135 R |
| 6,149,104 A | | 11/2000 | Soranno |
| 6,158,693 A | * | 12/2000 | Mueller et al. ......... 244/158 R |
| 6,193,187 B1 | * | 2/2001 | Scott et al. ............. 244/158 R |
| 6,286,787 B1 | | 9/2001 | Fleeter |
| 6,382,563 B1 | * | 5/2002 | Chiu .......................... 244/120 |
| 6,398,166 B1 | * | 6/2002 | Ballard et al. .............. 244/160 |

\* cited by examiner

CREWED ON-ORBIT, RETURNABLE, AND REUSABLE SPACE VEHICLE

FIELD OF THE INVENTION

The present invention generally relates to launch vehicles and, more particularly, relates to a reusable, modular, two-stage-to-orbit launch vehicle for carrying payloads into space.

BACKGROUND OF THE INVENTION

As is well known, the cost of developing, manufacturing, inspecting, and launching or otherwise carrying a payload, such as a satellite, into space is extremely high. These high costs are a function of many factors—the extreme complexity and precision of launch vehicles, the high labor costs of construction, the difficulty of achieving orbit, and the recurring cost of using one-time-use launch vehicles.

These high costs are further exacerbated when developing, manufacturing, inspecting, and launching space vehicles used for carrying a manned crew. In fact, until now there have been only approximately ten launch vehicles approved to carry man into space. Currently, there exists only two such qualified launch vehicles—the U.S. Space Shuttle and the Russian Soyuz. Of these two current launch vehicles, only the U.S. Space Shuttle includes a reusable airframe. Recently, there has been a need to develop a launch vehicle to replace the U.S. Space Shuttle.

In addition to external rocket boosters, the Space Shuttle includes three main engines mounted on the aft end of the orbiter, which burn propellant from an expendable tank from launch to orbit insertion. The Space Shuttle serves as a home and laboratory to a maximum of seven crew members for up to 16 days and is capable of transporting a wide range of cargo. It includes an airlock to enable space walks, a heat management system to accommodate the extreme temperature differences experienced in orbit, reentry panels to survive the 2500° temperatures experience in the Earth's atmosphere, and aerodynamic lifting/control surfaces to enable an aircraft-type landing. The Space Shuttle then requires approximately three to four months of processing, inspection, and repair in order to be ready for a subsequent launch. Therefore, with a four orbiter fleet, a maximum of twelve flights per year may be achieved; however, to date the greatest number of Space Shuttle launches in one year has been eight.

While the Space Shuttle was a technological triumph, NASA has identified two areas that need improvement—safety and cost. NASA has stated that the safety goal for any launch vehicle intended to replace the Space Shuttle should be a chance of a catastrophic accident resulting in a loss of crew of less than 1:10,000 and a chance of a vehicle loss of less than 1:1,000. One of the concerns of the current Space Shuttle orbiter is the lack of an escape system that can propel the entire crew away from a potentially deadly situation that might occur, especially while the vehicle is on the launch pad or in the early stages of ascent. There have been several studies to determine the feasibility of including such a system in the existing Space Shuttle, but the technical feasibility of heavily modifying existing hardware as well as the development costs have thus far thwarted all efforts.

Accordingly, there exists a need in the relevant art to provide a low cost launch system capable of transporting manned crews into space. Furthermore, there exists a need in the relevant art to provide a low cost launch system that is capable of being reused, without excessive inspection and refurbishment. Still further, there exists a need in the relevant art to provide a low cost launch system that is capable of achieving the above goals while maximizing the safety of the crew. Yet still further, there exists a need in the relevant art to provide a launch system that overcome the deficiencies of the prior art.

SUMMARY OF THE INVENTION

According to the principles of the present invention, a returnable and reusable space vehicle is provided having an advantageous construction. The space vehicle includes a main body separate from and releasably mounted to a booster rocket assembly. A crew compartment module is provided that is separate from and releasably mounted to the main body. A propellant system is operably coupled to the crew compartment module so as to propel the crew compartment module from the main body during an emergency procedure. An orientation control system is coupled to the propellant system such that the orientation control system maintains the crew compartment module in a predetermined attitude during the emergency procedure. A pair of aerodynamic lifting wings extend from the main body to provide aerodynamic lift to the main body to permit the main body to return from the orbit and land.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
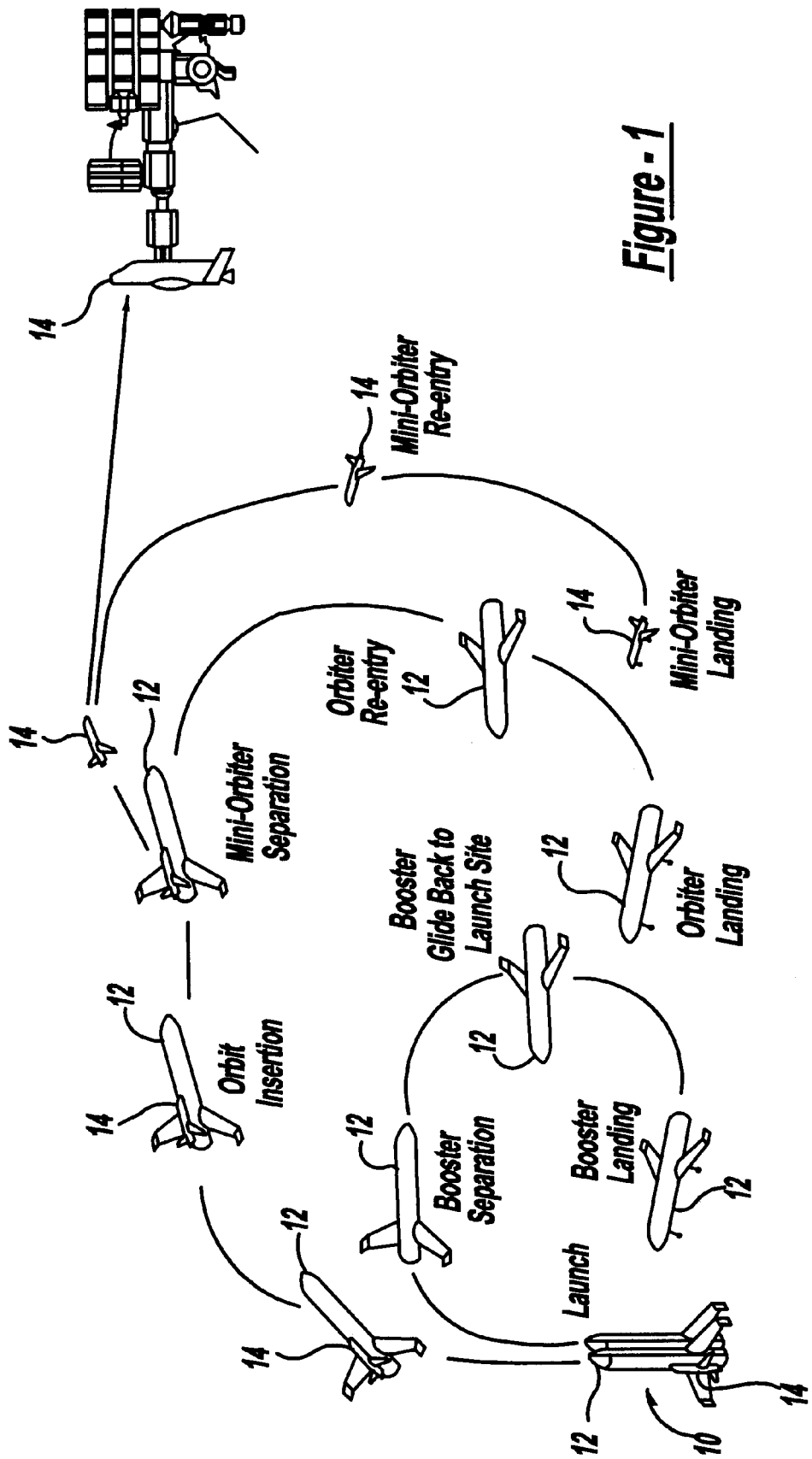
FIG. 1 is an operational diagram illustrating the operation of the space vehicle of the present invention.

The following description of the preferred embodiment is merely exemplary in nature and is in no way intended to limit the invention, its application, or uses.

Referring to the drawings, a launch vehicle 10 is illustrated according to the principles of the present invention. Launch vehicle 10 includes at least one booster 12 and an orbiter 14 mountable thereto. Orbiter 14 is a human-habitable space vehicle designed to be placed into Earth orbit. Orbiter 14 enables the crew to perform activities in a space environment, such as servicing the International Space Station, servicing and/or repairing existing satellites, and place equipment in orbit.

Figure 2:
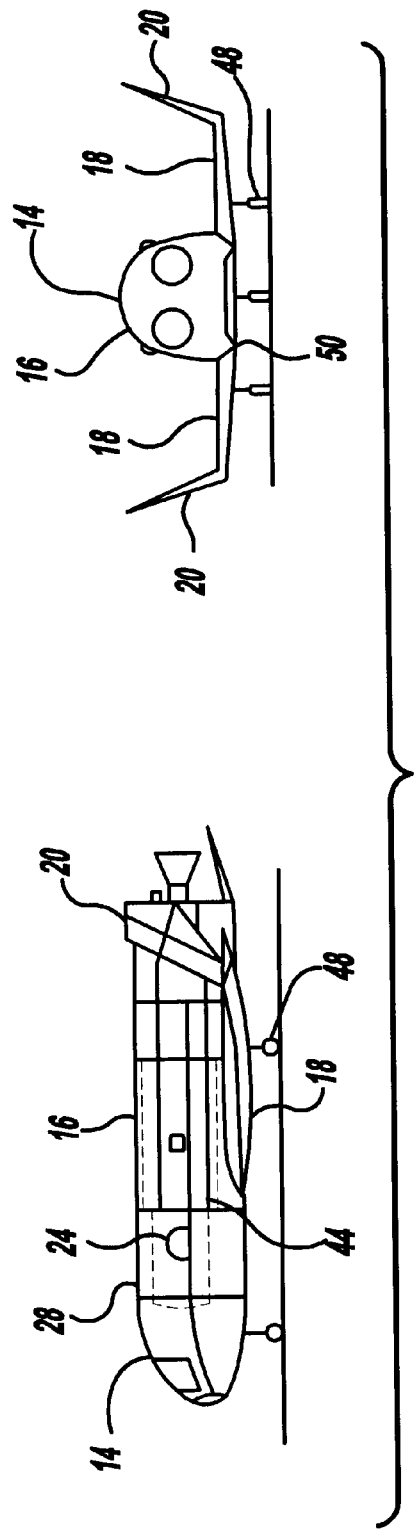
FIG. 2 is a three view drawing illustrating the space vehicle according to a first embodiment of the present invention.
Figure 2:
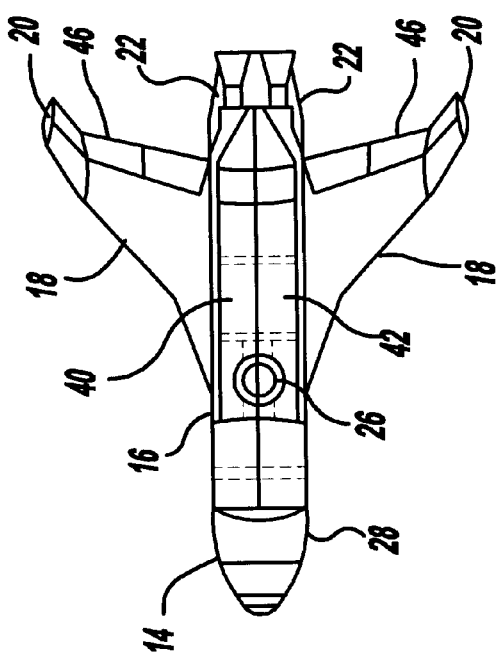
Figure 3:
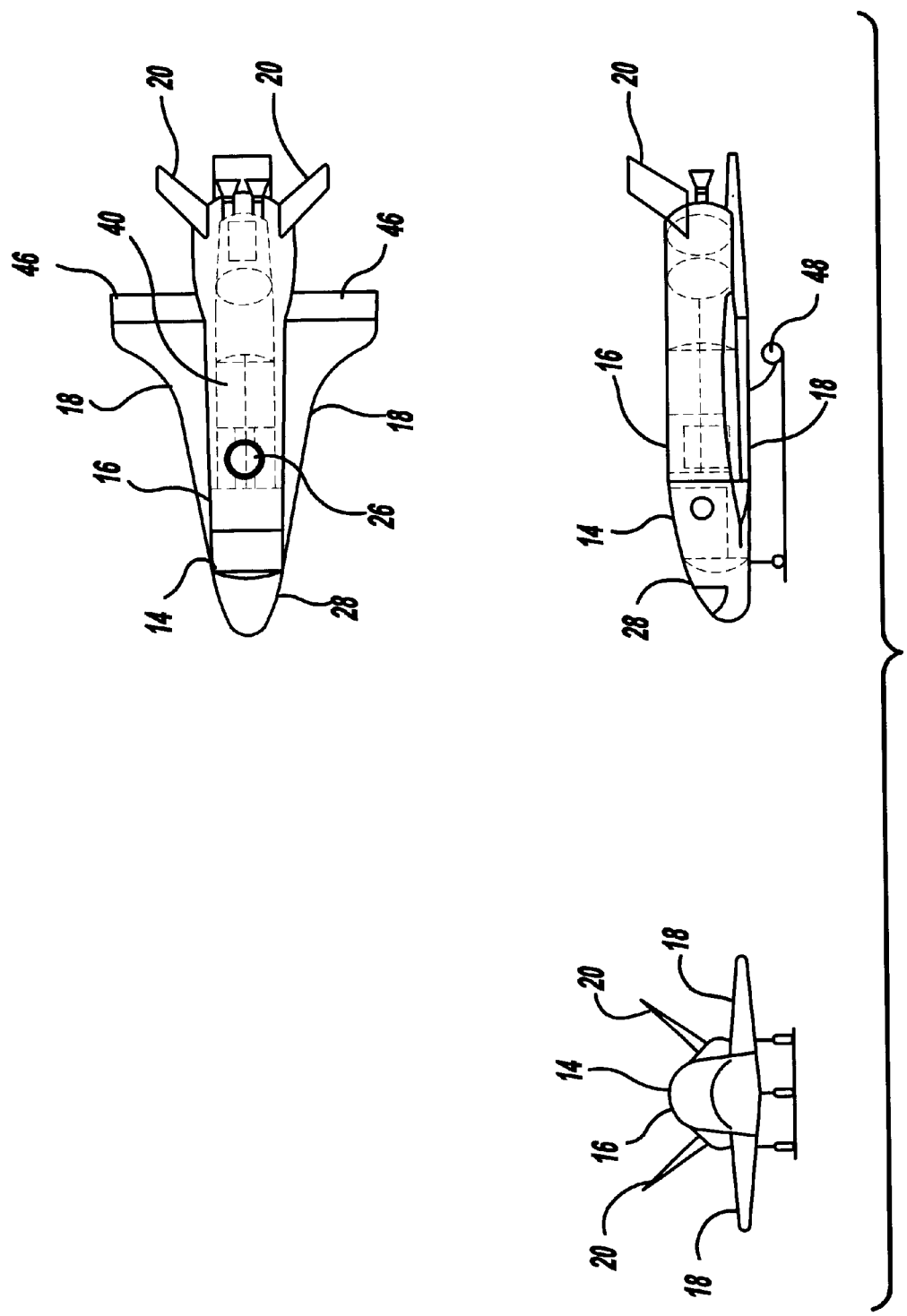
FIG. 3 is a three view drawing illustrating the space vehicle according to a second embodiment of the present invention.

As best seen in FIGS. 2 and 3, orbiter 14 includes a generally cylindrical-shaped main body or fuselage 16 having a pair of wings 18 and a pair of stabilizers or effectors 20. As seen in FIG. 2, the pair of stabilizers 20 may be mounted directly to the pair of wings 18. Alternatively, as seen in FIG. 3, the pair of stabilizers 20 may be mounted directly to main body 16. A plurality of orbital maneuvering engines 22 are mounted to an aft end of main body 16 for facilitating lateral maneuvering in space. Additionally, a plurality of reaction control thrusters 24 are mounted to main body 16 for controlling orientation of orbiter 14 in response to external forces. Accordingly, orbiter 14 is intended to return to Earth from orbit in a controlled manner, utilizing control rockets outside the atmosphere of Earth and the aerodynamic control surfaces of the pair of wings 18 and stabilizers 20 within the atmosphere so as to permit orbiter 14 to glide to a landing on a conventional aircraft runway.

Figure 4:
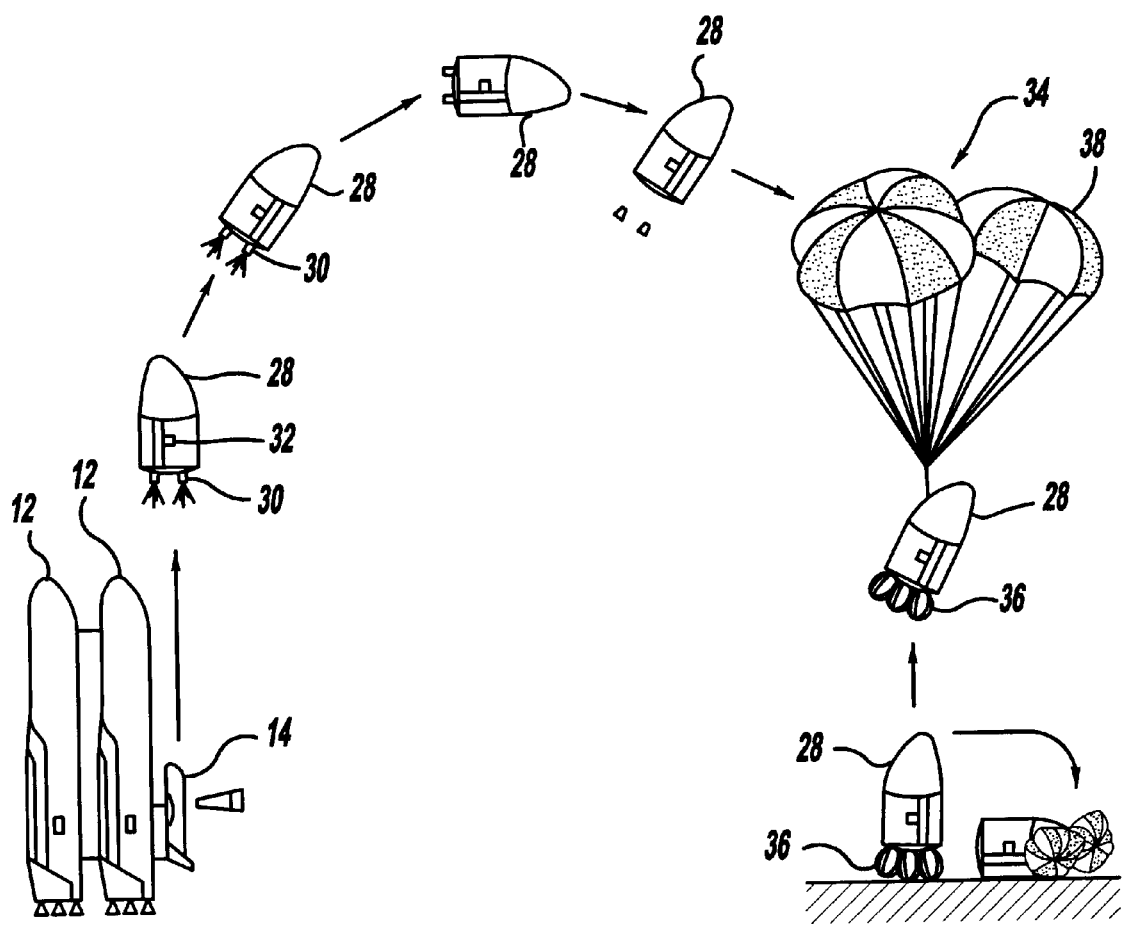
FIG. 4 is an operational diagram illustrating the operation of the crew compartment modules during an emergency procedure.

Orbiter 14 further includes an airlock 26 disposed in main body 16 to enable the crew to perform extravehicular activities. Airlock 26 serves as a lockable chamber between the interior of orbiter 14 and the space environment. Orbiter 14 still further includes a crew compartment module 28 coupled to main body 16. Crew compartment module 28 is removably secured to main body 16 such that during an emergency, crew compartment module 28 completely separates from the rest of main body 16. Crew compartment module 28 is preferably benign in that it does not contain an excessive amount of fuel or other potentially dangerous material. As best seen in FIG. 4, crew compartment module 28 includes a separation propellant system 30 for briefly propelling crew compartment module 28 away from the dangerous situation. Additionally, crew compartment module 28 includes an orientation system 32 for maintaining a proper trajectory and alignment of crew compartment module 28 during separation. Still further, crew compartment module 28 includes a parachute assembly 34 for reducing impact energy and an airbag system 36 disposed on the lower end thereof for absorbing a portion of the remaining impact energy during landing. Crew compartment module 28 may be separated from main body 16 during any one of a number of stages of flight—including while launch vehicle 10 is sitting on the launch pad, through a significant portion of the ascent of launch vehicle 10, and during the terminal phase of re-entry and landing.

Still referring to FIG. 4, a launch pad abort sequence is illustrated where crew compartment module 28 is separated from main body 16. It should be noted, however, that the following description applies specifically to a separation procedure executed from a launch pad configuration. Therefore, references to orientation of crew compartment module 28 may be different depending upon what phase of flight the separation operation is conducted. Specifically with regard to a launch pad separation, crew compartment module 28 is first separated from main body 16 through the generally simultaneous firing of separation propellant system 30 and the firing of a plurality of pyrotechnics disposed along key structural connections between crew compartment module 28 and main body 16. Crew compartment module 28 then accelerates upward away from main body 16 in response to ignition of separation propellant system 30. Orientation of crew compartment module 28 during acceleration is maintained by orientation system 32. During this phase, the crew may experience forces generally equal to ten times the force of gravity. This aids to quickly transport the crew away from any dangerous situation. Orientation system 32 will then execute a preprogrammed pitch and roll to orient crew compartment module 28 into a proper attitude for ascension until eventually reaching an apogee of approximately 5000 ft AGL. Orientation system 32 then pitches crew compartment module 28 generally upward for deployment of a drogue chute of parachute assembly 34. During this time, the rockets of separation propellant system 30 are separated from crew compartment module 28. Finally, a main chute assembly 38 of parachute assembly 34 and airbag system 36 is deployed to reducing impact energy.

Orbiter 14 still further includes a payload bay 40 disposed in main body 16. Payload bay 40 contains airlock 26 and additional area for a pressurized cargo carrier 42 or unpressurized cargo carrier 44. By non-limiting example, payload bay 40 is 25 feet long by 8 feet in diameter. A pair of doors of payload bay 40 may be configured to carry vehicle loads and contains various elements of the thermal control system. It should be noted that orbiter 14 does not include main engines or main engine propellant since orbiter 14 is intended to be placed in orbit prior to any maneuvering operations.

The pair of wings 18 are each preferably a thick, low-aspect ration wing. The structure of each wing 18 passes below payload bay 40 for improved weight carrying ability. Each wing 18 further includes large elevons 46 located along the aft section thereof. Main landing gear 48 is retractably mounted to an inboard section of the pair of wings 18. However, a pair of main attachment points 50 extend from an aft inboard section of the pair of wings 18 for coupling orbiter 14 to booster 12.

Generally, many of the on-board systems (avionics, power, mechanical, and fluid systems) use components available in the industry that meet performance, reliability, and overall vehicle cost requirements.

It should be appreciated that a substantial portion of launch vehicle 10 is reusable and is designed to minimize recurring costs as a result of improved design integration, operability, and overall vehicle size.

The space vehicle of the present invention makes space travel safer and at the same time radically reduces the cost of putting manned crews into earth orbit and beyond. The capabilities of the space vehicle of the present invention enables it to accomplish many of the missions currently performed by the Space Shuttle with significant improvements in vehicle design and operation. Improved safety comes from the inclusion of a separable crew escape module that carries the crew away from potentially catastrophic events. Cost savings come from the reduced size of the airframe, design improvements over current technology, and simplified and quick turnaround operations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A space vehicle comprising:
   a booster rocket assembly;
   a main body releasably mounted to said booster rocket assembly , said main body capable of maintaining and changing orbit;
   a crew compartment module separate from and releasably mounted to said main body;
   a separation propellant system operably coupled to said crew compartment module, said separation propellant system propelling said crew compartment module from said main body during an emergency procedure;
   a pair of aerodynamic lifting wings extending from said main body, said pair of aerodynamic lifting wings providing aerodynamic lift to said main body to permit said main body to return from said orbit and land;

a pair of aerodynamic lifting wings extending from said crew compartment module, said pair of aerodynamic lifting wings providing aerodynamic lift to said crew compartment module to permit said crew compartment module to return from said orbit and land.

2. The space vehicle according to claim 1, further comprising:
an orientation control system coupled to said separation propellant system, said orientation control system maintaining said crew compartment module in a predetermined attitude during said emergency procedure.

3. The space vehicle according to claim 1, further comprising:
an energy absorbing assembly coupled to said crew compartment modules, said energy absorbing assembly reducing the amount of impact energy experienced during landing of said crew compartment module.

4. The space vehicle according to claim 3 wherein said energy absorbing assembly is a parachute assembly.

5. The space vehicle according to claim 3 wherein said energy absorbing assembly is an airbag disposed along a lower section of said crew compartment module.

6. The space vehicle according to claim 1 wherein said propellant system is capable of being jettisoned from said crew compartment module during said emergency procedure.

7. The space vehicle according to claim 1, further comprising:
a plurality of maneuvering rockets disposed along said main body.

8. The space vehicle according to claim 1, further comprising:
landing gear operably coupled to said plurality of aerodynamic lifting wings; and
an airlock disposed in said crew compartment module.

9. The space vehicle according to claim 1 wherein said booster rocket assembly comprises:
a first booster rocket; and
a second booster rocket releasably coupled to said first booster rocket, said second booster rocket being released from said first booster rocket at a predetermined point.

10. A returnable and reusable space vehicle comprising,
a reusable booster rocket assembly;
a main body separate from and releasably mounted to said booster rocket assembly, said main body capable of achieving and maintaining orbit;
a crew compartment module separate from and releasably mounted to said main body;
a separation propellant system operably coupled to said crew compartment module, said separation propellant system propelling said crew compartment module from said main body during an emergency procedure;
an orientation control system couple to said separation propellant system such that said orientation control system maintain said crew compartment module in a predetermined attitude during said emergency procedure; and
a pair of aerodynamic lifting wings extending from said main body, said pair of aerodynamic lifting wing providing aerodynamic lift to said main body to permit said main body to return from said orbit and land;
a pair of aerodynamic lifting wings extending from said crew compartment module, said pair of aerodynamic lifting wings providing aerodynamic lift to said crew compartment module to permit said crew compartment modules to return from said orbit and land.

11. The returnable and reusable space vehicle according to claim 10, further comprising:
an energy absorbing assembly coupled to said crew compartment modules, said energy absorbing assembly reducing the amount of impact energy experienced during landing of said crew compartment module.

12. The returnable and reusable space vehicle according to claim 11 wherein said energy absorbing assembly is a parachute assembly.

13. The returnable and reusable space vehicle according to claim 11 wherein said energy absorbing assembly is an airbag disposed along a lower section of said crew compartment module.

14. The returnable and reusable space vehicle according to claim 10 wherein said separation propellant system is capable of being jettisoned from said crew compartment module during said emergency procedure.

15. The returnable and reusable space vehicle according to claim 10, further comprising:
a plurality of maneuvering rockets disposed along said main body.

16. The returnable and reusable space vehicle according to claim 10, further comprising:
landing gear operably coupled to said plurality of aerodynamic lifting wings; and
an airlock disposed in said crew compartment module.

17. The returnable and reusable space vehicle according to claim 10 wherein said booster rocket assembly comprises:
a first booster rocket; and
a second booster rocket releasably coupled to said first booster rocket, said second booster rocket being released from said first booster rocket at a predetermined point.

18. A space vehicle comprising;
a reusable booster rocket assembly;
a main body separate from and releasably mounted to said booster rocket assembly, said main body capable of achieving and maintaining orbit;
a crew compartment module separate from and releasably mounted to said main body;
a separation propellant system operably coupled to said crew compartment module , said separation propellant system propelling said crew compartment module from said main body during an emergency procedure;
an orientation control system coupled to said separation propellant system such that said orientation control system maintains said crew compartment module in a predetermined attitude during said emergency procedure;
a pair of aerodynamic lifting wings extending from said main body, said pair of aerodynamic lifting wings providing aerodynamic lift to said main body to permit said main body to return from said orbit and land;
an energy absorbing assembly coupled to said crew compartment modules, said energy absorbing assembly reducing the amount of impact energy experienced during landing of said crew compartment module
a pair of aerodynamic lifting wings extending from said crew compartment module, said pair of aerodynamic lifting wings providing aerodynamic lift to said crew compartment module to permit said crew compartment modules to return from said orbit and land.

19. The space vehicle according to claim 18 wherein said energy absorbing assembly is a parachute assembly.

20. The space vehicle according to claim 18 wherein said energy absorbing assembly is an airbag disposed along a lower section of said crew compartment module.

21. The space vehicle according to claim 18 wherein said propellant system is capable of being jettisoned from said crew compartment module during said emergency procedure.

22. The space vehicle according to claim 18, further comprising:
   landing gear operably coupled to said plurality of aerodynamic lifting wings; and
   an airlock disposed in said crew compartment module.

23. A space vehicle comprising
   a booster assembly capable of maintaining and changing orbit;
   a main body separable from said booster assembly
   a crew compartment module separate from and releasably mounted to said main body
   a separation propellant system operably coupled to said crew compartment module, said separation propellant system propelling said crew compartment module from said booster assembly while said space vehicle remains on a launch pad; and
   a pair of aerodynamic lifting wings extending from the crew compartment module, said pair of aerodynamic lifting wing providing aerodynamic lift to said crew compartment module to permit said crew compartment module to return from said orbit and land.

24. The space vehicle according to claim 23, further comprising:
   an orientation control system coupled to said propellant system, said orientation control system maintaining said crew compartment module in a predetermined attitude during said emergency procedure.

25. The space vehicle according to claim 23, further comprising:
   an energy absorbing assembly coupled to said crew compartment modules, said energy absorbing assembly reducing the amount of impact energy experienced during landing of said crew compartment module.

26. The space vehicle according to claim 25 wherein said energy absorbing assembly is a parachute assembly.

27. The space vehicle according to claim 25 wherein said energy absorbing assembly is an airbag disposed along a lower section of said crew compartment module.

28. The space vehicle according to claim 23 wherein said propellant system is capable of being jettisoned from said crew compartment module during said emergency procedure.

29. The space vehicle according to claim 23, further comprising:
   a plurality of maneuvering rockets disposed along said booster assembly.

30. The space vehicle according to claim 23, further comprising:
   landing gear operably coupled to said plurality of aerodynamic lifting wings; and
   an airlock disposed in said crew compartment module.

31. The space vehicle according to claim 23 wherein said booster rocket assembly comprises:
   a first booster rocket; and
   a second booster rocket releasably coupled to said first booster rocket, said second booster rocket being released from said first booster rocket at a predetermined point.

* * * * *